United States Patent [19]

Stuckey

[11] 3,832,891
[45] Sept. 3, 1974

[54] OCULAR TENSION MEASUREMENT
[75] Inventor: Gordon Stuckey, New South Wales, Australia
[73] Assignee: Stuckey Investments Pty. Ltd., New South Wales, Australia
[22] Filed: Dec. 29, 1972
[21] Appl. No.: 319,554

[30] Foreign Application Priority Data
Jan. 28, 1972   Australia............................ 7792/72

[52] U.S. Cl. .................................. 73/80
[51] Int. Cl. ............................ A61b 3/16
[58] Field of Search ....................... 73/80

[56] References Cited
UNITED STATES PATENTS
3,597,964   8/1971   Heine et al. ........................ 73/80

Primary Examiner—James J. Gill
Assistant Examiner—Anthony V. Clarlante
Attorney, Agent, or Firm—Weiner, Basile and Weintraub

[57] ABSTRACT

An applanation tonometer which utilizes the principle of total internal reflection to permit use thereof by an optholmologist. The tonometer comprises a member of pre-determined weight which is adapted for longitudinal sliding movement in and from a support and for resting upon the cornea of a patient. The end of the member which is rested upon the patient's cornea is formed from a material which has a refractive index approximately equal to that of tear film fluid whereby an area applanated by the member may be viewed at an angle incident to the plane of applanation.

9 Claims, 6 Drawing Figures

PATENTED SEP 3 1974 3,832,891

OCULAR TENSION MEASUREMENT

This invention relates to a method of and device for measurement of ocular tension, such measurement being hereinafter referred to as applanation tonometry.

Tonometry in the opthalmological sense is the measurement of pressure or tension (both expressions being synonymous in the present context) within the globe of the eye. The globe is filled with a fluid and the fluid exerts a pressure which maintains the shape of the globe as such. If the globe is soft (i.e., if the intra-ocular tension or pressure is too low) it will collapse and if the globe is too hard, the intra-ocular pressure being too high, the excessive pressure will gradually damage the contents of the globe and impair its "seeing" ability.

All practical methods of tonometry are based on the principle of applying force to the eyeball and measuring the resulting deformation. This may involve either flattening a portion of the globe, as in applanation tonometry, or indenting the globe as in impression tonometry. As above mentioned, the present invention concerns applanation tonometry.

Applanation tonometers (i.e., opthalmological devices for measuring the area of applanation or flattening of a globe) are well known. The first applanation tonometer was introduced by Maclakaw in 1885 and it comprised a rod of a fixed (known) weight having an enlarged base which was flattened to rest on the cornea of the eye. In use of this device, the cornea was coated with a dye in gelatine, the rod was rested on the cornea and an imprint of the (flattened) area of contact was transferred to a piece of paper after the manner of a rubber stamp.

Employment of the Maclakaw (and all subsequent) tonometers was (and is) based on the "Imbert-Fick" Law which states that:

"The pressure in a sphere filled with fluid and surrounded by an infinitely thin and flexible membrane is measured by the counter-pressure which just flattens the membrane to a plane."

Thus, with knowledge of the weight of a tonometer and by measurement of the area of applanation, the pressure within a globe may be determined. In use of the Maclakaw tonometer therefore, the area of the imprint gave a comparative measure of the intra-ocular tension.

Various tonometers have been developed since the Maclakaw device, one of which comprises a transparent tube having a solid, flat, base which is viewed by one looking downwardly along the axis of the tube. A magnifying lens is mounted to the upper end of the tube and the base is graduated with a scale such that a user might see and measure the circle of applanation, in order that the intra-ocular tension may be computed.

The one applanation tonometer which is currently employed utilizes a spring and lever system to apply a force in a horizontal direction against a patient's eye, the force being applied through a transparent (graduated) cylinder. The force is varied by adjustment of the device until the area of applanation for any given patient fills a graduated circle having a diameter of 3.06 millimeters. The graduated circle is viewed through a magnifying lens and its size is chosen on the basis that a one-gram loading on the area encircled has been computed to represent an intra-ocular pressure of 10 mm Hg. The instrument, which is referred to as a "Goldmann Tonometer," is calibrated in tenths of a gram in order to give comparative pressure readings in mm. Hg. units.

All of the tonometers developed to date have certain characteristic disadvantages. The first abovementioned (Macklakaw) device gives rise to inaccurate results and the others referred to above, whilst they give satisfactory comparative results, are inherently expensive.

It is an object of the present invention to provide an applanation tonometer which is of economical construction (and which may therefore be treated as a disposable opthalmological tool), which gives a direct reading of applanation and which may be conveniently read in use by an opthalmologist.

Thus, there is provided in accordance with the present invention, an applanation tonometer comprising a member of predetermined weight adapted for longitudinal sliding movement within and from one end of a tubular support therefor, at least one end portion of the member being solid and formed from a transparent material having a refractive index approximately equal to that of tear film fluid, the (extreme) terminal end surface of the said one end portion of the member being marked to define an area of predetermined width or being of a predetermined cross-sectional area, the terminal end surface being adapted for resting upon a subject's eye and the area of contact between the terminal end of the member and the eye being visible when viewed at an angle incident to the zone of contact by virtue of the end portion of the member having a refractive index approximately equal to that of the tear film fluid.

The tonometer of the present invention is different from prior art devices in that, in use, the device relies upon the phenomena of total internal reflection occurring in the end portion thereof. This means that, by viewing through the side of the tonometer member and toward the terminal end thereof, the terminal end will under normal conditions act as a mirror. However, upon placing the terminal end of the member in contact with the cornea of a patient's eye, the tear fluid covering the cornea will wet the end of the device over the area of contact, this being the area of applanation. Then, by the tear fluid having a refractive index approximately equal to that of the contacting material, total internal reflection will not occur over the area of applanation and the degree or area of applanation will be visible through the side wall of the device.

It will be appreciated from the foregoing that the material from which the tonometer, or, at least, the solid end portion of the tonometer, is constructed should have a refractive index sufficiently close to that of tear fluid (or salt water) in order that the terminal end of the tonometer ceases to act as a mirror when placed in contact with the tear fluid. The above employed expression "—having a refractive index approximately equal to that of a tear film fluid" should be construed in this context.

An assessment of the pressure prevailing in a patient's eye is determined by reference to the area applanation and this is in turn measured by reference to the marking on or cross-sectional area of the terminal end of the tonometer member. Thus, as above stated, the terminal end of the member may be marked to define an area of predetermined width (representative of, for example, the diameter of an applanation area which is deemed normal) or the terminal end may be formed with a cross-sectional area which is sized to define a "normal" applanation area.

The tonometer member may therefore comprise a square-section rod having a uniform cross-section of a predetermined dimension for its full length or, in an alternative form, the member may comprise a generally circular-section rod having one end portion thereof shaped as a square-section projection.

However, in a preferred form of the invention, the tonometer member comprises a circular-or-square-section rod of arbitrary cross-sectional dimension, the terminal end of the rod being marked or inscribed to define within the markings an area or areas of predetermined width. The terminal end of the member may in fact be marked or inscribed to define a square or a circle, but it will be appreciated that two lines which are representative of the diameter (or width) of an applanation area will be sufficient.

The terminal end of the tonometer is preferably constituted by a planar surface disposed at right-angles to the axis of the member. However, such terminal end might alternatively be formed as a convex or concave surface, provided that, in the latter case, the degree of concavity is not greater than the curvature of the cornea of a patient's eye.

The tonometer member is preferably formed from a moulded plastics material such as perspex, but it might equally be formed from glass.

The cross-sectional dimension of the tonometer member or (in the preferred case) the width of the marked area of the terminal end of the member, and the weight of such member, are determined in order that one may obtain a correlation between the area of applanation which would be expected under conditions of normal intra-ocular tension and a measured area of applanation for any given patient. Determination of these dimensions may be achieved by the employment of the following formula, where the terminal end of the rod device has a planar surface:

$$F = (D/3.06)^2 \cdot [P + 0.023 (D^4 - 3.06^4)]$$

where
- $F$ = Force (or weight) exerted by the tonometer measured in tenths of a gram
- $D$ = Diameter in millimetres of circle of applanation. That is, the diameter of a circle to be defined by or contained within the area or within the inscribed area of the terminal end of the tonometer, and
- $P$ = Intra-ocular pressure in mm. Hg. (i.e. pressure assumed for purpose of calibrating the before-mentioned Goldman Tonometer).

Assuming a 4 mm. diameter circle of applanation and use of a tonometer having a 4 mm. square terminal end, then the weight of the tonometer member may be solved as follows for the pressure:

15 mm. Hg. — 3.22 gm.
16 mm. Hg. — 3.39 gm.
17 mm. Hg. — 3.58 gm.
18 mm. Hg. — 3.73 gm.

Again, assuming an intra-ocular pressure of 15 mm. Hg. and a tonometer member having its terminal end marked with two lines which are spaced-apart by a distance of 3.06 mm., then the weight of the member may be solved as 1.5 gm.

It should be noted that, in employing the above formula, no account is taken of meniscus effect. The wet meniscus resulting from the tear fluid will be included in the area seen and therefore the pressure measurement must be regarded as "low" by a constant amount. However, the meniscus, in being a constant size, may be compensated for when readings are required other than for simple comparative purposes.

The average pressure within the human eye is taken as 15 to 16 mm. Hg. (assumed for purpose of calibrating the Goldman Tonometer). Therefore, by employing a tonometer rod member having a square-section terminal end with sides with 4 mm. in length and having a weight of 3.22 gm., the area of applanation measured should be defined by a circle which just touches the four sides of the tonometer. Similarly, by employing a tonometer member having its terminal end marked with two lines spaced-apart by 3.06 mm. and having a weight of 1.5 gm, the area of applanation measured should be defined by a circle having a diameter that just extends between the two lines. If the circle of applanation fails to fill the square-section terminal end or fails to extend between the marked lines, then indication is given that the intra-ocular pressure is too high.

If an irregular reading is obtained, the patient may then be subjected to more exhaustive testing.

It will be appreciated from the foregoing that a single tonometer device in accordance with the invention may be used only for comparative testing, that is for separating the normal from the abnormal. However, by an opthalmologist keeping a range of devices of different weights for selective use, an accurate assessment may be made of the actual (assumed) intra-ocular pressure existing in a patient's eye.

The invention will be more fully understood from the following description of a preferred embodiment thereof taken in conjunction with the accompanying drawings wherein, FIG. 1 is a perspective view of a tonometer member;

As illustrated, the tonometer member comprises a base portion 10 having a terminal end 11, which is sized to be rested upon the cornea of a patient's eye, and a circular section stem portion 12. The stem portion has a diameter significantly less than that of the base portion in order that the centre of gravity of the member is located toward the terminal end thereof.

Figure 1:
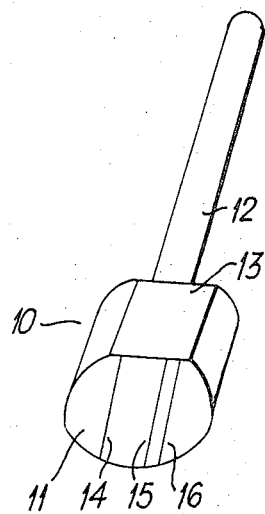
Figure 2:
FIGS. 2 and 3 are elevation and inverted plan views respectively of the tonometer member.
Figure 3:
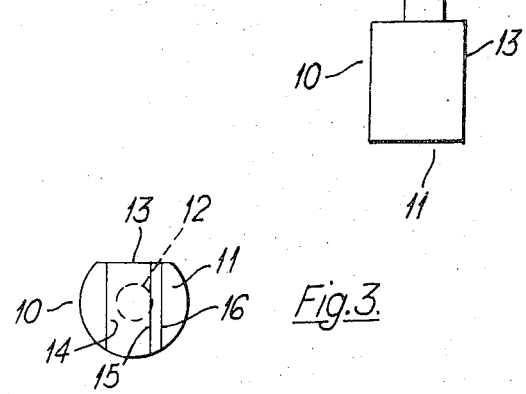

The base portion 10 of the tonometer member is of a generally (solid) cylindrical form but it incorporates a planar circumferential wall portion 13. Thus, as shown in FIG. 3, the base portion of the member is shaped in cross-section as a major segment of a circle having a chord representing the planar wall portion 13.

The member is formed from glass or from a transparent synthetic plastics material having a refractive index approximately equal to salt water or tear film fluid, and the base portion 10 of the tonometer is coated around the curved circumferential portion thereof with a dye or other colouring agent. The planar wall portion 13 is however uncoated and it does, in effect, constitute a window of the device.

The terminal end 13 of the tonometer member is etched or otherwise inscribed with three lines 14, 15, and 16; the lines 14 and 15 being spaced-apart by a distance of 3.06 mm. and the lines 14 and 16 being spaced-apart by a distance of 4 mm.

Figure 4:
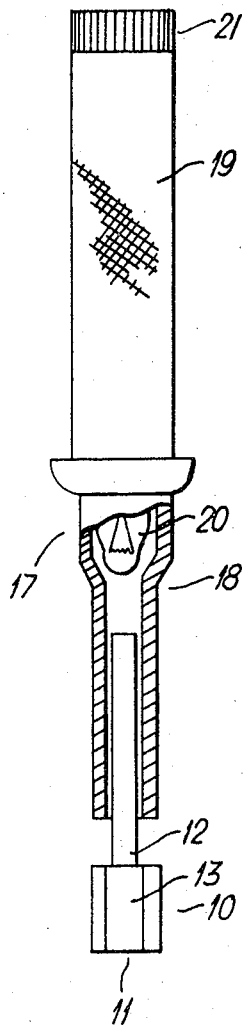
FIG. 4 is an elevation view of the tonometer member shown in operative relationship to a support therefor.

As is shown in FIG. 4, the stem portion 12 of the tonometer member is sized for free sliding movement in a support member 17. The support member incorporates a lower sleeve 18 which receives the stem portion 12 and an upper (integral) holder 19. The holder houses batteries and a lamp 20 which is arranged to beam light along the axis of the tonometer member. A rotary switch 21 is mounted to and forms a portion of the holder 19 to permit selective energisation of the lamp 20.

Figure 5:
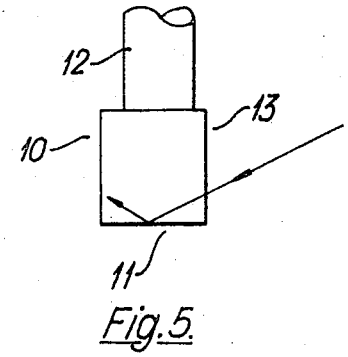
FIGS. 5 and 6 are schematic representations of the principle of operation of the tonometer member.

With the device described thus far, and as is indicated in FIG. 5, if one was to view through the planar wall portion or window 13 and toward the terminal end of the tonometer at times other than when the tonometer is in contact with a patient's eye, total internal reflection would occur and the terminal end would act as a mirror.

Figure 6:
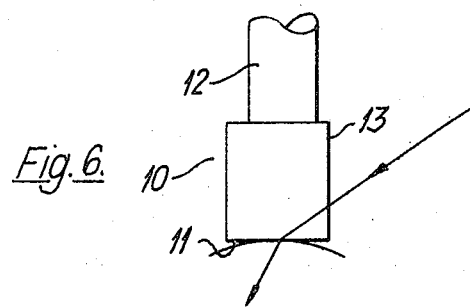

However, as is shown in FIG. 6, the terminal end 11 of the tonometer member would (in use) be rested upon the cornea of a patient's eye with the stem portion 12 extending in a vertical (upward) direction. Then, by viewing through the planar wall portion or window 13 and toward the terminal end of the device, an opthalmologist would be able to see the area of the cornea which is applanated by the tonometer, this being made possible by the existence of tear film fluid between the cornea and the contacting area of the tonometer.

The support member 17 is employed to hold the tonometer member 10 in the vertical position and to beam light along the axis of the tonometer member, but it is held in such manner that it does not bear on or otherwise add to the mass of the tonometer member.

I claim:

1. An applanation tonometer, comprising, in combination:
   a. an elongate member of predetermined weight adapted for longitudinal sliding movement within and from one end of a sliding support therefor;
   b. at least one end portion of said elongate member being solid and formed from a transparent material having a refractive index approximately equal to that of tear film fluid;
   c. said end portion of said elongate member including a planar wall observation surface which is disposed substantially parallel to the longitudinal axis of said elongate member;
   d. a terminal end surface of said one end portion of said elongate member being marked to define an area of predetermined width;
   e. said terminal end surface being adapted for resting upon the cornea of the subject's eye; and
   f. the area of contact between said terminal end surface of said elongate member and said eye being visible when viewed through said observation surface and at an angle which is obliquely incident to said area of contact by virtue of said end portion of said elongate member having a refractive index approximately equal to that of said tear film fluid.

2. An applanation tonometer according to claim 1, wherein:
   a. said end portion of said elongate member is generally cylindrical in form, except for a planar circumferential wall portion; and
   b. a stem portion projects axially outwardly from said elongate member in a direction opposite to that of said terminal end of said member.

3. An applanation tonometer according to claim 1, wherein said terminal end of said member is planar and is disposed at an angle which is normal to the longitudinal axis of said member.

4. An applanation tonometer according to claim 2, wherein said terminal end of said member is marked with at least two parallel spaced-apart lines, said lines extending in a direction substantially perpendicular to said circumferential planar wall portion of said member.

5. An applanation tonometer according to claim 2, wherein the cylindrical surface of said end of said member is coated with a coloring agent.

6. An applanation tonometer as claimed in claim 1, wherein the weight of the member is determined in accordance with the following formula:

$$F = (D/3.06)^2 \cdot [P = 0.023 \ (D^4 - 3.06^4)]$$

where,
$F$ = Force (or weight) exerted by the member measured in tenths of a gram,
$D$ = Diameter (in millimeters) of a circle applanted by a force F, and
$P$ = Intra-ocular pressure in mm. Hg.

7. An applanation tonometer according to claim 1, including:
   a. a support therefor, said support comprising a sleeve adapted to receive said elongate member in sliding relationship; and
   b. a holder mounted to one end of said sleeve, said holder incorporating a lamp which is adapted to beam light along the axis of the tonometer member when supported within said sleeve.

8. An applanation tonometer according to claim 7, wherein said holder also incorporates a removable drycell type battery, and a switch in circuit between said battery and said lamp.

9. An applanation tonometer, comprising, in combination:
   a. an elongate member of predetermined weight adapted for longitudinal sliding within and from one end of a sliding support therefor;
   b. at least one end portion of said elongate member being solid and formed from a transparent material having a refractive index approximately equal to that of tear film fluids;
   c. a terminal end surface of said one end portion of said elongate member being of a predetermined cross-sectional area;
   d. said end portion including a planar wall observation surface which is disposed substantially parallel to the longitudinal axis of said elongate member;
   e. said terminal end surface being adapted for resting upon the cornea of a subject's eye; and
   f. the area of contact between said terminal end of said member and said eye being visible when viewed through said observation surface and at an angle which is obliquely incident to said area of contact by virtue of the end portion of said member having a refractive index approximately equal to that of said tear film fluid.

* * * * *